US011216431B2

United States Patent
Koepke et al.

(10) Patent No.: US 11,216,431 B2
(45) Date of Patent: Jan. 4, 2022

(54) PROVIDING A COMPACT REPRESENTATION OF TREE STRUCTURES

(71) Applicant: Apple Inc., Cupertino, CA (US)

(72) Inventors: Hoyt A. Koepke, Seattle, WA (US); Srikrishna Sridhar, Seattle, WA (US)

(73) Assignee: Apple Inc., Cupertino, CA (US)

( * ) Notice: Subject to any disclaimer, the term of this patent is extended or adjusted under 35 U.S.C. 154(b) by 715 days.

(21) Appl. No.: 15/851,668

(22) Filed: Dec. 21, 2017

(65) Prior Publication Data
US 2019/0079962 A1   Mar. 14, 2019

Related U.S. Application Data

(60) Provisional application No. 62/557,276, filed on Sep. 12, 2017.

(51) Int. Cl.
*G06F 16/22*   (2019.01)
*G06F 16/901*   (2019.01)
*G06N 20/00*   (2019.01)

(52) U.S. Cl.
CPC ...... *G06F 16/2246* (2019.01); *G06F 16/2237* (2019.01); *G06F 16/9027* (2019.01); *G06N 20/00* (2019.01)

(58) Field of Classification Search
CPC .................................................. G06F 16/2246
See application file for complete search history.

(56) References Cited

U.S. PATENT DOCUMENTS

| | | | |
|---|---|---|---|
| 8,751,823 B2 | 6/2014 | Myles et al. | |
| 9,116,720 B2 | 8/2015 | Dunn et al. | |
| 9,286,345 B2 | 3/2016 | Bandholz et al. | |
| 10,332,008 B2 * | 6/2019 | Burger | G06F 16/285 |
| 2014/0337269 A1 * | 11/2014 | Eads | G06N 20/00 |
| | | | 706/46 |
| 2015/0262063 A1 | 9/2015 | Burger et al. | |
| 2015/0379429 A1 * | 12/2015 | Lee | G09B 5/00 |
| | | | 706/11 |
| 2018/0217991 A1 * | 8/2018 | Dato | G06F 16/9535 |

FOREIGN PATENT DOCUMENTS

WO   WO-2018136371 A1 *   7/2018   ............. H03M 7/46

\* cited by examiner

*Primary Examiner* — Dawaune A Conyers
(74) *Attorney, Agent, or Firm* — Morgan, Lewis & Bockius LLP (57) ABSTRACT

The subject technology provides for generating a set of nodes representing a tree structure, each node comprising a feature index, a flag field indicating branch directions, an execution index storing locations related to the branch directions, and a feature value for comparing with the value stored in the input feature vector. The subject technology generates evaluation data, the evaluation data comprising a first array containing index values, and a second array containing evaluation values respectively corresponding to the index values, the evaluation data representing values of leaf nodes from the set of nodes. Further, the subject technology stores the set of nodes and the evaluation data as a contiguous block of data, where the set of nodes includes a first node and a second node, the second node corresponding to a likely execution path from the first node being physically stored adjacent to the first node.

20 Claims, 8 Drawing Sheets

PROVIDING A COMPACT REPRESENTATION OF TREE STRUCTURES

CROSS-REFERENCE TO RELATED APPLICATIONS

The present application claims the benefit of U.S. Provisional Patent Application Ser. No. 62/557,276, entitled "PROVIDING A COMPACT REPRESENTATION OF TREE STRUCTURES," filed Sep. 12, 2017, which is hereby incorporated herein by reference in its entirety and made part of the present U.S. Utility Patent Application for all purposes.

TECHNICAL FIELD

The present description relates to providing data structures storing tree structures, such as tree ensembles, for representing machine learning models.

BACKGROUND

Existing representations of tree structures may utilize a particular scheme for storing to memory or disk. However, such tree structures may be stored in a non-contiguous manner and be represented in a scheme that includes extraneous data resulting in increased memory or disk usage.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Existing approaches for storing representations of tree structures may include storing additional extraneous data in conjunction with storing the representations of the tree structures. The extraneous data may be a consequence of inefficient storage schemes that result in increased memory usage. For example, such a storage scheme may not be optimized for transmission of data over a network and/or for storing contiguous data on disk.

Implementations of the subject technology provide compact representations of tree structures that are more efficient, from both a memory and processing resource perspective, than existing approaches. In an example, such compact representations of tree structures can be applied for machine learning models for different applications including, without limitation, search, classification, image recognition, text prediction, handwriting recognition, machine translation, face detection, etc. The compact representations of the tree structures enable machine learning models to be executed and stored efficiently on a given electronic device. The subject technology may provide a library of these machine learning models referred to herein as tree ensemble models for access by any application on a given electronic device. A tree ensemble model may refer to machine learning techniques in which tree structures (e.g., corresponding to decision trees) can be utilized to make predictions or classifications, among other types of operations, based on sequences of comparisons between input data and features values.

Figure 1:
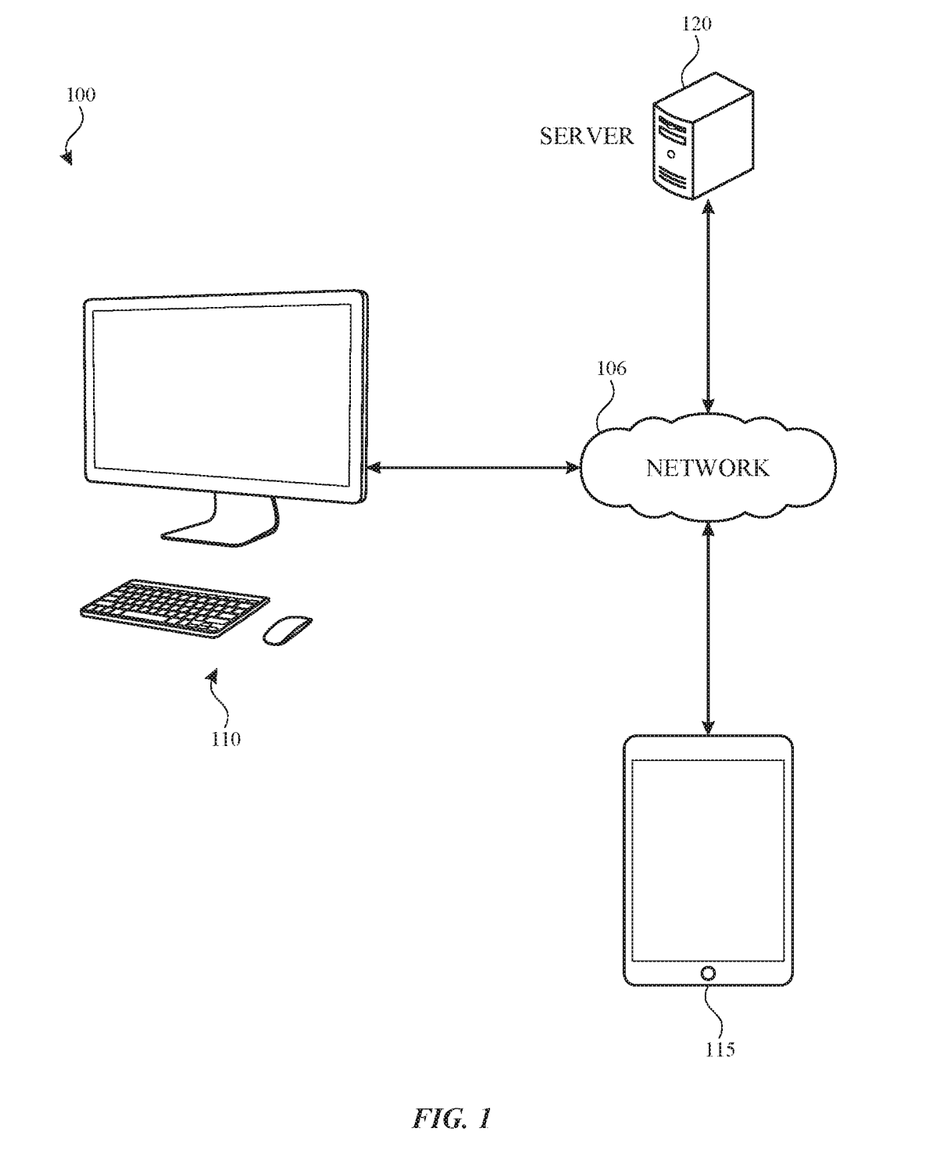
FIG. 1 illustrates an example network environment for providing compact representations of tree structures in accordance with one or more implementations.

FIG. 1 illustrates an example network environment 100 for providing compact representations of tree structures in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110, an electronic device 115, and a server 120. The network 106 may communicatively (directly or indirectly) couple the electronic device 110 and/or the server 120, the electronic device 115 and/or the server 120, and/or electronic device 110 and/or the electronic device 115. In one or more implementations, the network 106 may be an interconnected network of devices that may include, or may be communicatively coupled to, the Internet. For explanatory purposes, the network environment 100 is illustrated in FIG. 1 as including an electronic device 110, an electronic device 115, and a server 120; however, the network environment 100 may include any number of electronic devices and any number of servers.

The electronic device 110 may be, for example, desktop computer, a portable computing device such as a laptop computer, a smartphone, a peripheral device (e.g., a digital camera, headphones), a tablet device, a wearable device such as a watch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 110 is depicted as a desktop computer. The electronic device 110 may be, and/or may include all or part of, the electronic system discussed below with respect to FIG. 8.

The electronic device 115 may include a touchscreen and may be, for example, a portable computing device such as a laptop computer that includes a touchscreen, a smartphone that includes a touchscreen, a peripheral device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 115 may not include a touchscreen but may support touchscreen-like gestures, such as in a virtual reality or augmented reality environment. In one or more implementations, the electronic device 115 may include a touchpad. In FIG. 1, by way of example, the electronic device 115 is depicted as a tablet device with a touchscreen. In one or more implementations, the electronic device 115 may be, and/or may include all or part of, the electronic device discussed below with respect to the electronic system discussed below with respect to FIG. 8.

The electronic device 110 and/or the electronic device 115 include a framework that is enabled to provide access to tree ensemble models. A framework can refer to a software environment that provides particular functionality as part of a larger software platform to facilitate development of software applications. In one or more implementations, the electronic devices 110 and/or 115 may include a framework that is able to access and/or execute the tree ensemble models, which may be provided in a particular software library in one implementation.

Figure 2:
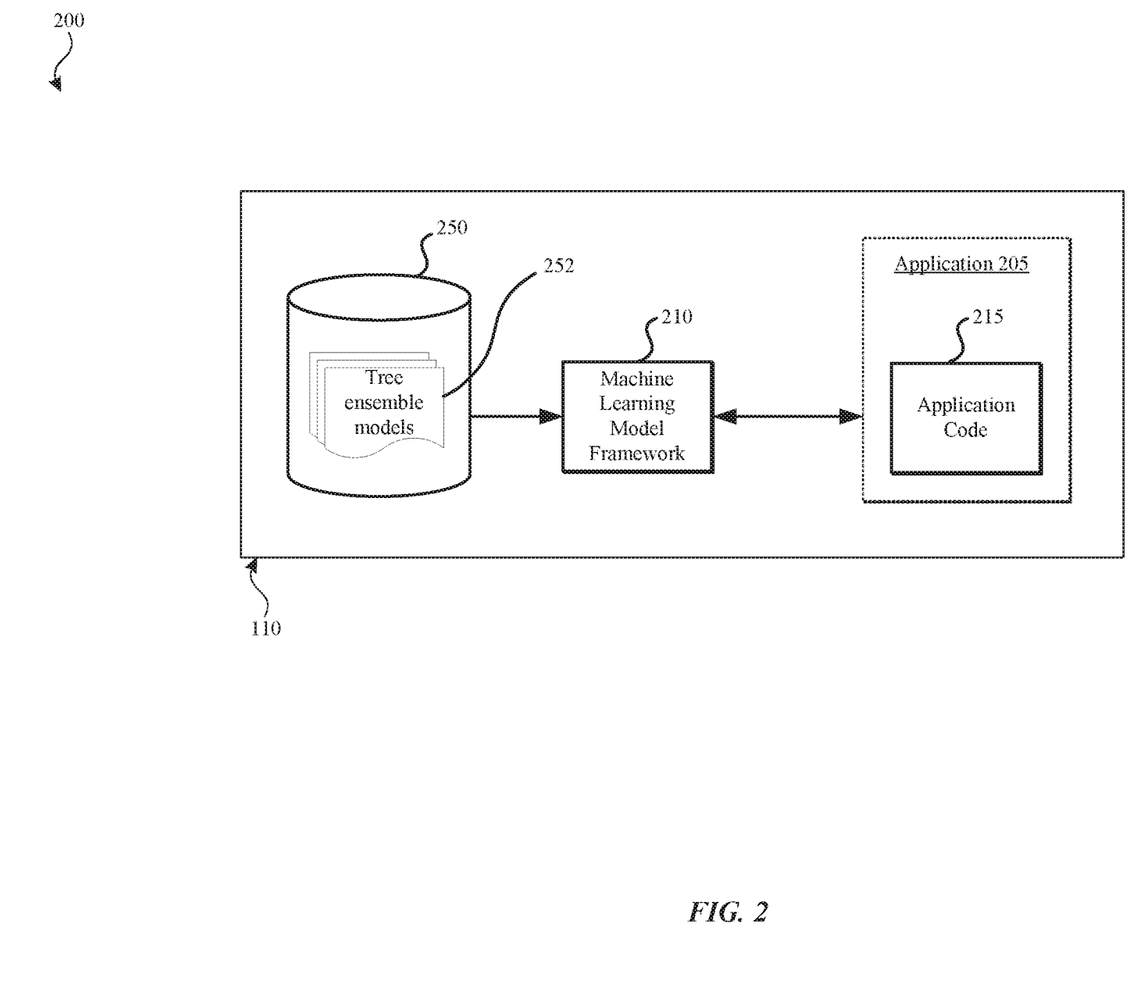
FIG. 2 illustrates an example software architecture for providing tree structures based on a compact representation storage scheme in accordance with one or more implementations.

FIG. 2 illustrates an example software architecture 200 for providing tree structures based on a compact representation storage scheme in accordance with one or more implementations. In the example of FIG. 2 as described below, the software architecture 200 is provided by the electronic device 110 of FIG. 1, such as by a processor and/or memory of the electronic device 110; however, it is appreciated that, in some examples, the software architecture 200 may be implemented at least in part by any other electronic device (e.g., electronic device 115). Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated, the software architecture 200 includes a memory 250 including tree ensemble models 252 and a machine learning (ML) model framework 210. The tree ensemble models 252 may be provided as a software library which may be programmatically accessed by the machine learning model framework 210. The machine learning model framework 210 of the electronic device 110 can be implemented, in an example, as a system interface that provides a software architecture and abstraction layer to facilitate communication with underlying hardware of a device and also enable translation of the tree ensemble models 252 into a compatible ML specification that can be utilized by a given application executing on the electronic device 110. The framework may include a dynamic shared library and the resources (such as header files, images, and helper apps) needed to support the shared library. Similarly, it is appreciated that the electronic device 115 may also provide the above-described framework to access tree ensemble models on the electronic device 115.

As further illustrated in the example of FIG. 2, an application 205 running on the electronic device 110 may utilize the framework to access the tree ensemble models 252. Application code 215 of the application 205 may include code that calls a function included in a particular application programming interface (API), which invokes a part of the ML model framework 210 to access and/or execute the tree ensemble models 252. Example data structures for implementing tree structures utilized by the tree ensemble models 252 are described in more detail in FIGS. 3 and 4 below.

In an example, a tree ensemble model includes a large collection of tree structures where each tree structure includes a set of interconnected nodes. Each node in a given tree structure represents a split on a particular condition. Evaluating a tree structure begins at the root node and a particular condition is evaluated on the input data. Based on whether the condition is evaluated as true or false, the tree structure is traversed to the next node and the tree is traversed until reaching a leaf node. In an example, the leaf node includes information corresponding to a value, based on the entire set of conditions that has been evaluated on the input data, that may be applied to an output of the tree ensemble model and/or change or modify the output of the tree ensemble model after each tree structure has been traversed (e.g., as part of a voting or summation post-processing operation). Examples of storing and accessing a tree structure in a tree ensemble model are described in further detail in FIGS. 5 and 6 below. Further, in an example, the results of each tree structure can be summed together along with a post-processing step which provides a final result as discussed in more detail in FIG. 7 below.

Figure 3:
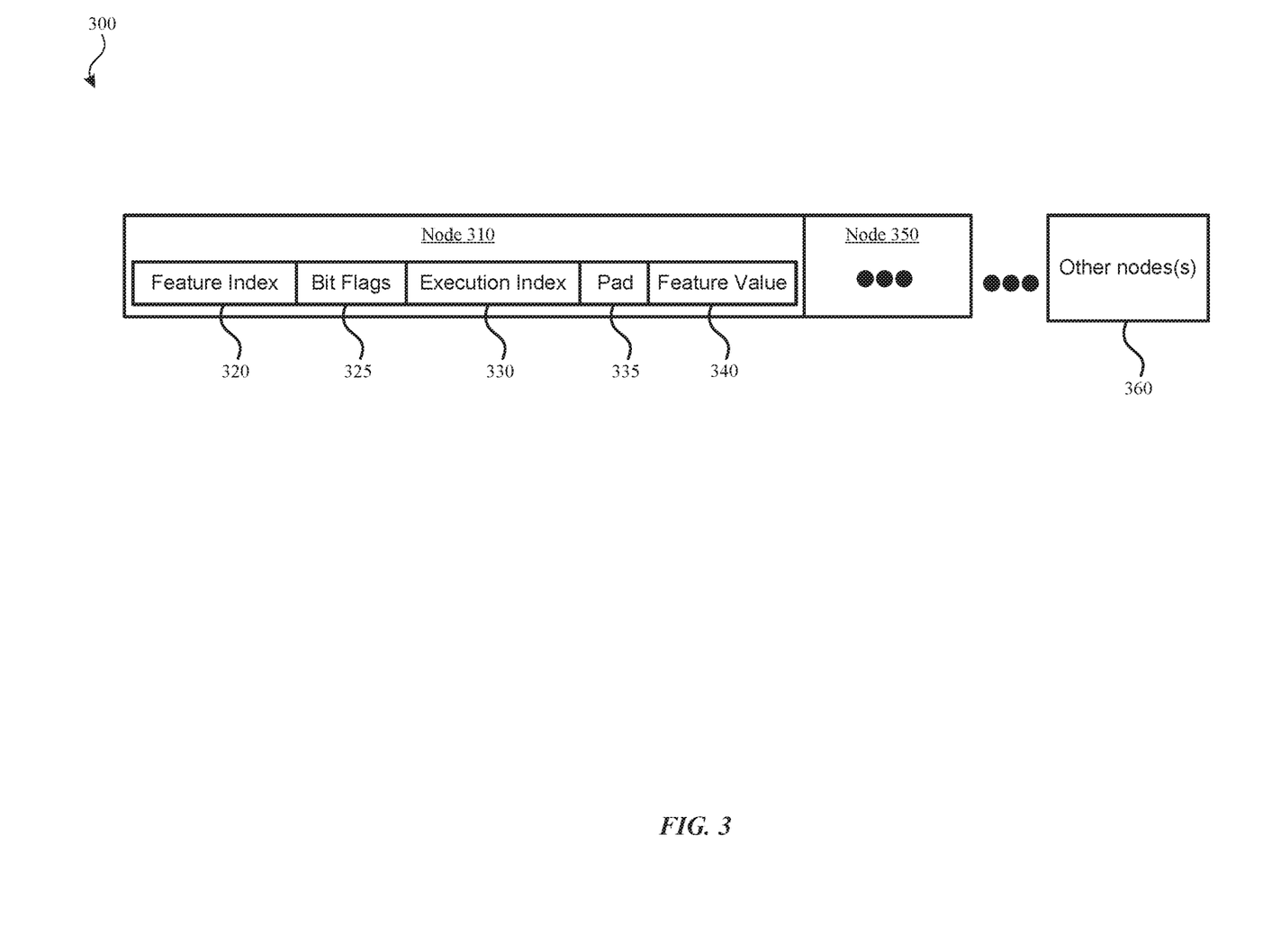
FIG. 3 illustrates an example data structure for providing a tree structure in accordance with one or more implementation of the subject technology.

FIG. 3 illustrates an example data structure for providing a tree structure 300 in accordance with one or more implementation of the subject technology. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The example data structure, in one or more implementations, may correspond to tree structures that are utilized by a tree ensemble model from the tree ensemble models 252. As illustrated, a node 310 is included with the tree structure 300. The node 310 includes a feature index 320, bit flags 325, execution index 330, pad 335, and feature value 340. A node 350 is shown as being stored contiguous in physical memory to the node 310, and other nodes 360 can be stored subsequently in a contiguous manner with the node 350 and so on.

The feature index 320 represents the index in the input feature vector that will be utilized in the comparison condition. In one or more implementations, a first block of data in the node 310 is the feature index 320, which can be stored using a minimum number of bits needed to store each feature index. Using the described storage scheme, the feature index 320 is stored at the beginning of the node 310. When using a cache line prefetch (e.g., where 32 bytes are read using a cache prefetch operation), the feature index 320 and at least a portion of a next node (e.g., node 350) is read from memory into a CPU cache (or any other appropriate cache) as a result of the feature index of the next most likely node (e.g., node 350) to be traversed being stored in the respective bytes following the node 310.

The node 350 stored in the tree structure included in a given tree ensemble model, as described herein, therefore may be pre-determined to be the most likely execution path when evaluating the node 310. In an example, the most likely execution path as used herein may be based on data that the tree ensemble model is trained on (e.g., a training dataset). For example, hit counts indicating which nodes of tree structures of the tree ensemble model are traversed based on a given training dataset and statistics on each of the nodes may be provided to determine which particular node corresponding to the most likely execution path (e.g., a first particular node corresponding to a most likely execution path was hit 57,000 times out of 100,000 input values and a second particular node corresponding to a less likely execution path was hit 43,000 times out of 100,000 input values).

In this manner, a prefetch operation can be performed to prefetch the next node as the current node (e.g., the node 310) is being evaluated, and thus avoid having to wait on the CPU to perform a read operation from memory at a later time in the likely case that the node 350 is the next node to be evaluated.

The bit flags 325 correspond to a flag field in which one or more flags can be stored as a bit. The bit flags 325 control node behavior, particularly with respect to which comparison operations are used, and include a few bits that provide the information describing the node behavior. For instance, the bit flags 325 indicate a type of comparison that is used.

In one or more implementations, the bit flags 325 store three (3) bitwise flags and the branch mode: 1) whether the true direction is to a leaf or a node; 2) whether the false direction is to a leaf or a node; 3) whether NAN (not a number) values (which can show up in the input feature) follow the true or false direction; and 4) the branch comparison mode, and if all comparisons are comparison operations corresponding to lesser-than equal or greater than (<= or >) or corresponding to greater-than equal or lesser than (>= or <), this is one bit, otherwise, three (3) bits are used to represent comparison operations for lesser-than equal, lesser than, greater-than equal, greater than, equal to, and not equal to (<=, <, >=, >, ==, !=).

The execution index 330 includes information for determining a location of a next node related to the next operation in the execution. Depending on the bit flags 325, this information could include the false jump index, e.g., the node index offset when the branch comparison is false, or the index referring to the location in the evaluation value data where the value for either one or both of the leaf nodes is stored.

In one or more implementations, three possible cases are provided with respect to the execution index 330. First, both branch directions jump to a node. In this first case, the execution index 330 includes the index delta to the node to jump to if the comparison is false. If the comparison is true, however, then the node 350 (e.g., the next node stored adjacent to the current node 310) will be the node where the jump is performed. Second, one of the branch directions is a jump to a node, and one is an evaluation value. In this second case, the jump is to the next node, and this is the index location of the evaluation data. Third, both branch directions are to evaluation values. In this third case, the information includes the index location of the evaluation value of the true evaluation value data, which is followed by the false evaluation value data, e.g., the false evaluation value data is stored contiguously after the true evaluation value data.

The node 310 contains feature value 340 that is used for the comparison with the value stored at the feature index 320 of the input feature vector. In at least one implementation, the feature value 340 is either thirty-two (32) bits or sixty-four (64) bits and includes a float value (e.g., floating point number). To avoid potential shifting and truncation operations that could impact performance, the feature value 340 may be byte aligned to the last four (4) or eight (8) bytes of the block of data of the node 310.

In one or more implementations, the feature value 340 is byte aligned as mentioned above. In an example, extra bits corresponding to pad 335, between the bit flags 325 and the false jump index of the execution index 330, are added so that the false jump index is packed against the byte boundary before the block of data of the execution index 330. This padding of extra bits (e.g., from zero to seven bits of padding) is included in the node 310 to prevent data loss when casting the bytes containing the jump index (e.g., to the next node) to a particular data type (e.g., an index_t type). For example, suppose that the index_t type is thirty-two (32) bits in length, and twenty-eight (28) bits are needed to hold the indices of the execution index 330. Now, suppose that these twenty-eight (28) bits of the indices start two bits before a first byte boundary and ends two bits after a second byte boundary. In this example, casting the block of data to index_t (e.g., 32 bits) at the first byte boundary containing the indices (e.g., before performing a shift operation to determine the actual index) would truncate the final two bits as these final two bits start at the fifth byte from the first byte including the indices. In comparison, when including the padding of bits to have one of the ends be against a byte boundary, this potential loss of bits can be prevented.

Figure 4:
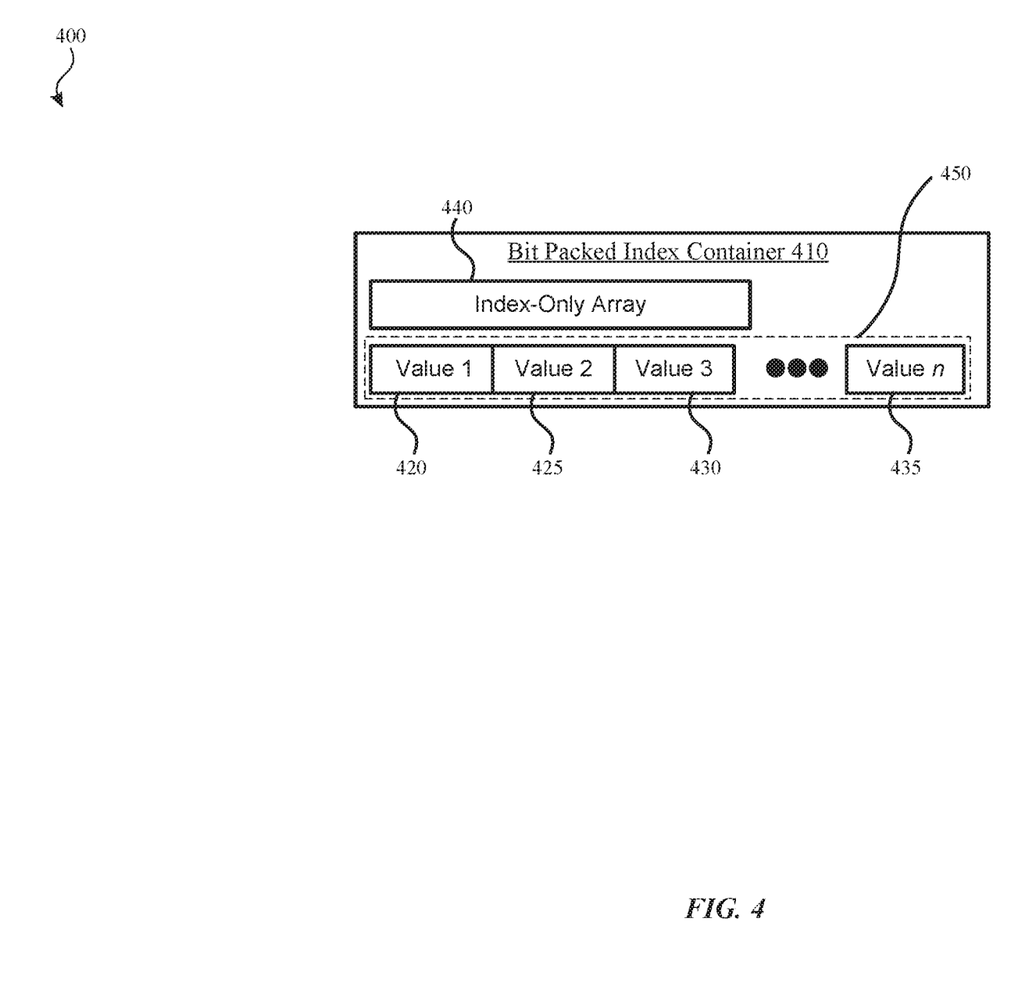
FIG. 4 illustrates an example data structure for storing evaluation data in accordance with one or more implementation of the subject technology.

FIG. 4 illustrates an example data structure 400 for storing evaluation data in accordance with one or more implementation of the subject technology. As illustrated, evaluation data for the leaf nodes of a tree structure included in a tree ensemble are implemented using two separate arrays as described in further detail below.

As illustrated, the data structure 400 includes a bit packed index container 410 in which the evaluation values, for compactness, are stored in two arrays including an index-only array 440, and an array 450 storing evaluation values. The index in this case is the index of the dimension in the prediction output that the evaluation value is applied to, thus it may be only a few bits wide if the prediction output is low dimensional. If the output is single dimensional, the index-only array 440 can be empty (e.g., contain no values). The array 450, in one or more implementations, is an array of floating point values (e.g., float or double data types). As shown in the example of FIG. 4, the bit packed index container 410 stores respective indices (e.g., index values) in the index-only array 440 corresponding to positions of the evaluation values 420, 425, 430, and 435 stored in the array 450. In an example, the index-only array 440 could be sixty-four (64) bits in length, and the array 450 includes 1 to n number of evaluation values, although any appropriate size for the index-only array 440 and number of evaluation values may be supported by implementations of the subject technology.

In one or more implementations, for a given leaf node of a tree structure with multiple evaluation values, an extra bit is added to the start of the evaluation index in the index-only array 440 to indicate whether the index is at the end of the range of applied values. To apply values, a bit mask is applied to the evaluation indices to get the feature index, and a particular bit outside of the bit mask indicates whether to stop determining evaluation values after that index is applied.

For applying the evaluation values, the indices are stored in the nodes as offsets from the first index of the tree structure. In one example, the indices may be stored contiguously after the nodes of the tree structure. This therefore allows a more compact representation of the indices in the node data. In another example, when this information may not be inferred from other sources, the base indices for these offsets, common for all nodes in a given tree structure, are stored in the evaluation index offset data stored in the index-only array 440.

Figure 5:
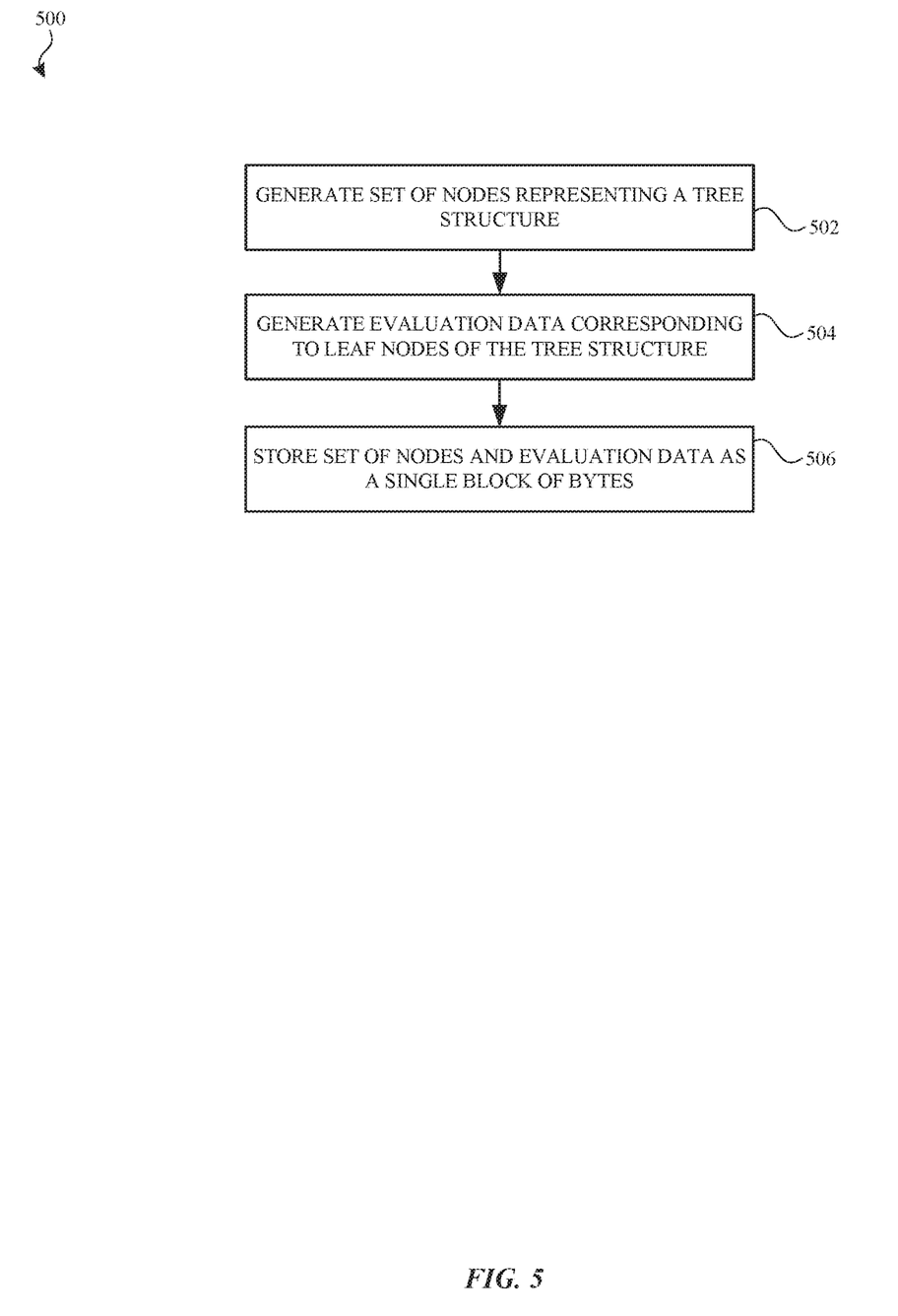
FIG. 5 illustrates a flow diagram of an example process for storing tree structures in accordance with one or more implementations.

FIG. 5 illustrates a flow diagram of an example process 500 for storing tree structures in accordance with one or more implementations. For explanatory purposes, the process 500 is primarily described herein with reference to components of the software architecture of FIG. 2 (particularly with reference to the machine learning model framework 210), which may be executed by one or more processors of the electronic device 110 of FIG. 1. However, the process 500 is not limited to the electronic device 110, and one or more blocks (or operations) of the process 500 may be performed by one or more other components of other suitable devices. Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations. The process 500 below may be performed by the machine learning model framework 210 in order to generate tree structures corresponding to a given tree ensemble model.

The machine learning model framework 210 generates a set of nodes representing a tree structure (502) for a tree ensemble model. In an example, the nodes in the tree structure are interconnected with other nodes where the tree structure can include a root node, one or more intervening nodes (e.g., non-leaf nodes), and one or more leaf nodes. Each node includes a feature index, a flag field, an execution index, and a feature value. The feature index (e.g., the feature index 320) includes bits representing a feature index value for indexing into an input feature vector corresponding to the tree ensemble model. The flag field (e.g., the bit flags 325) includes information indicating a branch comparison mode representing a comparison operation to be applied at the node. The flag field also includes information indicating a move to a node or leaf node corresponding to a true condition, and a move to node or a leaf node corresponding to a false condition. The execution index (e.g., the execution index 330) includes information indicating a location related to a next operation of execution for the tree ensemble model where the next operation corresponds to a different node or evaluation data based on the result of the comparison operation indicated in the flag field.

The machine learning model framework 210 generates evaluation data where the evaluation data includes a first array containing index values (e.g., the index-only array 440), and a second array (e.g., the array 450) containing evaluation values, and the evaluation data represents leaf node values of leaf nodes from the set of nodes (504). In an example, the evaluation data is generated using an evaluation dataset that can be based on given input data for the tree ensemble model.

The machine learning model framework 210 stores the set of nodes and the evaluation data are stored as a single block of data (506). In an example, the single block of data may be stored on disk and then may loaded into memory (e.g., random access memory) of the electronic device 110. The feature index (e.g., the feature index 320) includes bits representing a feature index value where the bits correspond to an initial set of bits of the single block of data. In addition, the feature value includes a second plurality of bits that represent a floating point value in which the second plurality of bits are byte aligned to a byte boundary of the single block of data.

Figure 6:
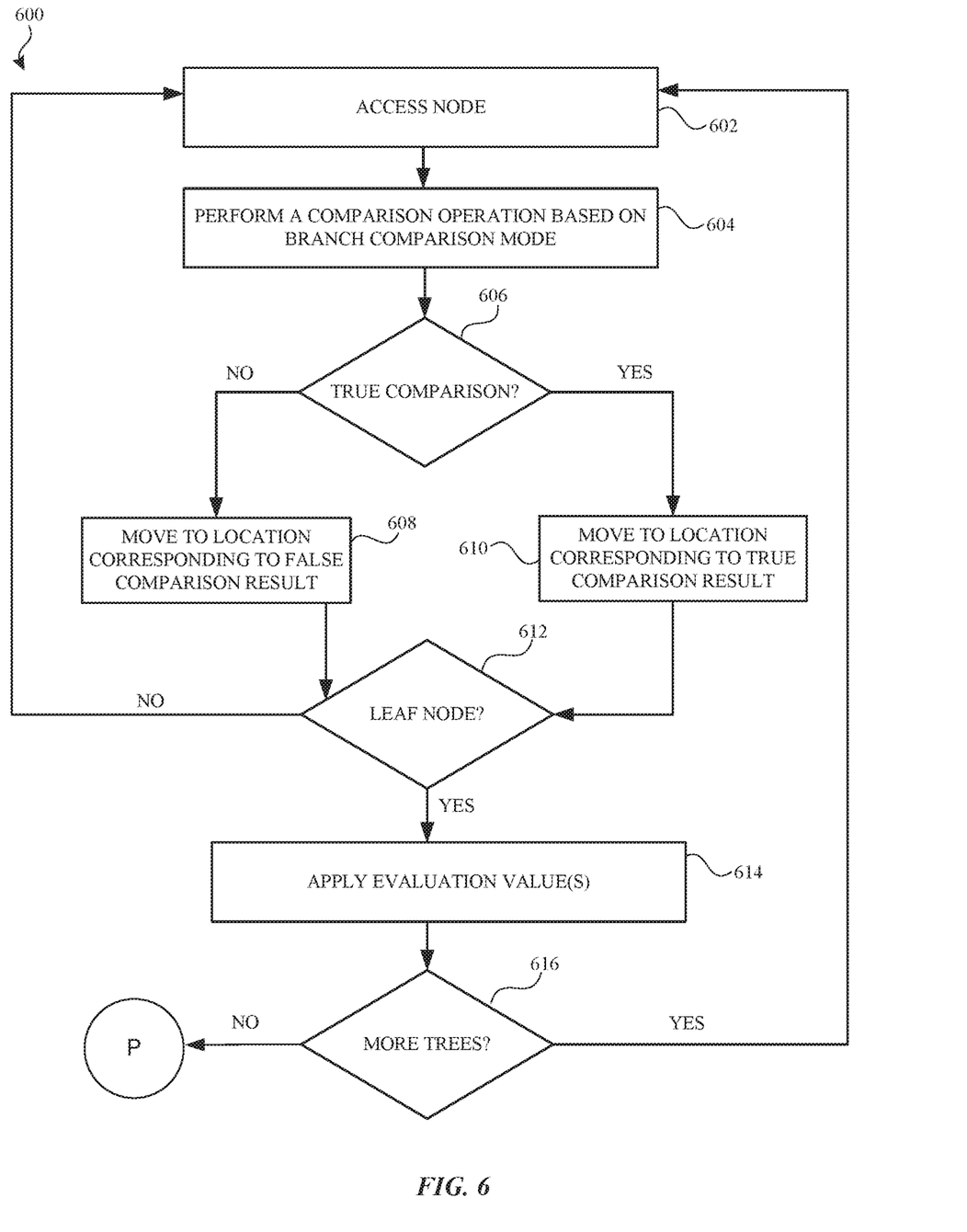
FIG. 6 illustrates an example process for traversing tree structures in accordance with one or more implementations.

FIG. 6 illustrates an example process 600 for traversing tree structures in accordance with one or more implementations. For explanatory purposes, the process 600 is primarily described herein with reference to components of the software architecture of FIG. 2 (particularly with reference to the machine learning model framework 210), which may be executed by one or more processors of the electronic device 110 of FIG. 1. However, the process 600 is not limited to the electronic device 110, and one or more blocks (or operations) of the process 600 may be performed by one or more other components of other suitable devices. Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

One aspect of machine learning focuses on making a prediction through the use of a machine learning model on a given set of input data. Instead of using a single model for such a given task, a model ensemble utilizes a set of models. A tree ensemble model may utilize a set of models (e.g., decision trees represented by respective tree structures in the tree ensemble model) which are executed to make a prediction based on aggregating the outputs of the set of models. Advantageously, using a model ensemble may improve the accuracy of the prediction in comparison with only using a single model to make the prediction.

To execute a given tree ensemble model to provide an output (e.g., a prediction provided by the tree ensemble model), the machine learning model framework 210 may select and traverse each tree structure in the tree ensemble model. The machine learning model framework 210 therefore accesses a first node (e.g., the node 310) from a set of nodes corresponding to a first tree structure provided by a tree ensemble model (602). The machine learning model framework 210 performs a comparison operation based on a branch comparison mode indicated by a flag field (e.g., the bit flags 325) of the first node (604). For example, the machine learning model framework 210 can compare, based on the comparison operation, a value from an input feature vector, corresponding to the feature index (e.g., the feature index 320) with the feature value (e.g., feature value 340). The machine learning model framework 210 then determines whether the comparison operation evaluates to a true condition or a false condition (606).

Based on the result of the comparison operation, the machine learning model framework 210 determines whether to access the first location corresponding to the true condition, or whether to access the second location corresponding to the false condition. If the result of the comparison operation evaluates to the true condition, the machine learning model framework 210 accesses the particular node, the particular leaf node, or the particular evaluation data based on a first index location provided in an execution index (e.g., the execution index 330) of the first node (610). Alternatively, if the result of the comparison operation evaluates to the false condition, the machine learning model framework 210 accesses the particular node, the particular leaf node, or the particular evaluation data based on a second index location provided in an execution index (e.g., the execution index 330) of the first node (608). The execution index does not store a second location when the respective directions of the true and false conditions point to nodes (e.g., where the direction of the true condition jumps to the next node).

The machine learning model framework 210 then determines whether a leaf node was accessed as a result of the comparison operation (612). If so, the machine learning model framework 210 can apply at least one evaluation value to a prediction vector (614), determine whether there are more tree structures to process in tree ensemble model (616), and read a different tree structure and repeat the operations described above (602). Alternatively, if machine learning model framework 210 determines that a leaf node was not accessed (612), a different node is accessed and the operations described above (602) are repeated. In the case that the machine learning model framework 210 determines that there are no more tree structures to process (616), then the process 600 can perform post-processing operations which are further described in FIG. 7 below.

Figure 7:
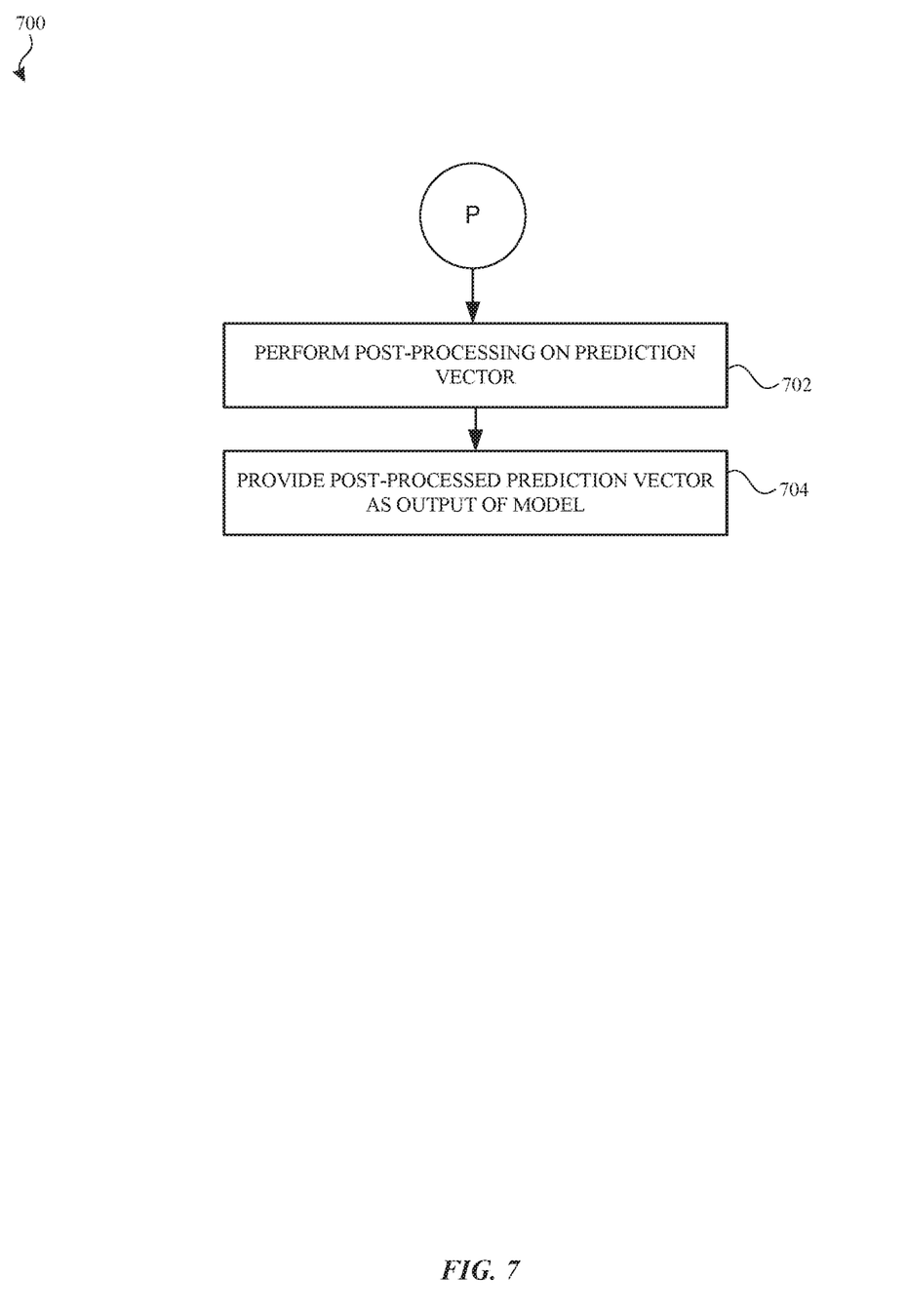
FIG. 7 illustrates an example process for post-processing a prediction vector to provide a prediction result in accordance with one or more implementations.

FIG. 7 illustrates an example process for post-processing a prediction vector to provide a prediction result in accordance with one or more implementations. For explanatory purposes, the process 700 is primarily described herein with reference to components of the software architecture of FIG. 2 (particularly with reference to the machine learning model framework 210), which may be executed by one or more processors of the electronic device 110 of FIG. 1. However, the process 700 is not limited to the electronic device 110, and one or more blocks (or operations) of the process 700 may be performed by one or more other components of other suitable devices. Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations. As mentioned above, the operations illustrated in FIG. 7 may be performed in conjunction with the process 600 in FIG. 6 (e.g., after there are no more tree structures to process in the tree ensemble model).

The machine learning model framework 210 performs a post-processing operation on a prediction vector (702) which corresponds to an output vector after executing the tree ensemble model. In an example, after finishing evaluating each tree structure in the tree ensemble, the machine learning model framework 210 performs post-processing to provide final output. Each tree or each leaf of a tree will add one or more values to the prediction vector. The prediction vector is initially initialized to a particular set of values (e.g., a ten dimensional vector to a set of default values). Each leaf evaluation value will change one or more of those default values by adding the evaluation value stored in the leaf using the corresponding index. The machine learning model framework 210, in an example, performs post-processing on this prediction vector by normalizing and/or scaling the values in the prediction vector which produces a final output. Next, the machine learning model framework 210 provides the post-processed prediction vector as an output of the tree ensemble model (704), which may as an example correspond to a particular prediction or classification from the tree ensemble model based on the input feature vector. In an example, the post-processed prediction vector includes values for respective classes and each value indicates a likelihood of the corresponding class being the correct result of the tree ensemble model.

Figure 8:
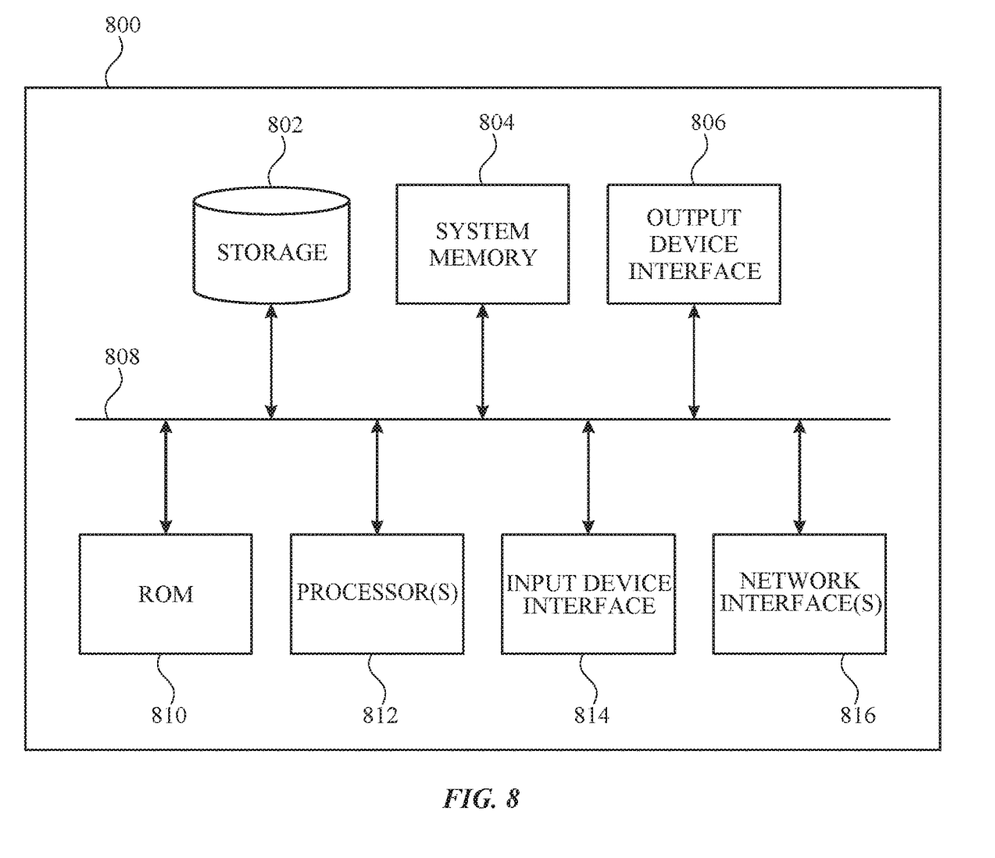
FIG. 8 illustrates an electronic system with which one or more implementations of the subject technology may be implemented.

FIG. 8 illustrates an electronic system 800 with which one or more implementations of the subject technology may be implemented. The electronic system 800 can be, and/or can be a part of, the electronic device 110, the electronic device 115, and/or the server 120 shown in FIG. 1. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes, such as the electronic device 82 shown in FIG. 1, through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation.

Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
    generating a set of nodes representing a tree structure, each node comprising a feature index, stored as an initial set of contiguous bits, for accessing a value stored in an input feature vector, a flag field indicating branch directions, an execution index storing locations related to the branch directions, and a feature value for comparing with the value stored in the input feature vector, the tree structure corresponding to a machine learning model;
    generating evaluation data, the evaluation data comprising a first array containing index values, and a second array containing evaluation values respectively corresponding to the index values, the evaluation data representing values of leaf nodes from the set of nodes; and
    storing the set of nodes and the evaluation data as a contiguous block of data, wherein the set of nodes includes a first node and a second node, the second node corresponding to a predicted execution path from the first node and the second node being physically stored adjacent to the first node.

2. The method of claim 1, wherein the feature index comprises a plurality of bits representing a feature index value, the plurality of bits corresponding to an initial set of bits of the contiguous block of data.

3. The method of claim 1, wherein the feature value comprises a second plurality of bits that represent a floating point value, the second plurality of bits being byte aligned to a byte boundary of the contiguous block of data, the feature value representing a particular value to compare with the value stored at the feature index of the input feature vector.

4. The method of claim 1, wherein the flag field comprises information indicating a branch comparison mode representing a comparison operation of the node.

5. The method of claim 4, wherein the flag field further comprises information indicating a first leaf node or first particular node corresponding to a true condition for the comparison operation of the node, and a second leaf node or second particular node corresponding to a false condition for the comparison operation of the node.

6. The method of claim 5, wherein the execution index comprises information indicating an index location related to a next operation based on a result of the comparison operation, the next operation corresponding to a different node or evaluation data.

7. The method of claim 6, further comprising:
    accessing the first node from the set of nodes;
    performing the comparison operation based on the branch comparison mode from the flag field;
    determining whether the comparison operation evaluates to the true condition or the false condition; and
    based on comparison operation, accessing the first particular node or first leaf node corresponding to the true condition, or accessing the second particular node or the second leaf node corresponding to the false condition.

8. The method of claim 7, wherein performing the comparison operation further comprises:
    comparing, based on the comparison operation, a particular value stored at the feature index of the input feature vector with the feature value.

9. The method of claim 7, further comprising:
    applying an evaluation value to an output vector, the output vector including respective values indicating probabilities of potential results of the machine learning model.

10. The method of claim 9, further comprising:
    performing a post-processing operation on the output vector; and
    providing the post-processed output vector as an output of the machine learning model.

11. A system comprising;
a processor;
a memory device containing instructions, which when executed by the processor cause the processor to:
generate a set of nodes representing a tree structure, each node comprising a feature index, stored as an initial set of contiguous bits, for accessing a value stored in an input feature vector, a flag field indicating branch directions, an execution index storing locations related to the branch directions, and a feature value for comparing with the value stored in the input feature vector, the tree structure corresponding to a machine learning model;
generate evaluation data, the evaluation data comprising a first array containing index values, and a second array containing evaluation values respectively corresponding to the index values, the evaluation data representing values of leaf nodes from the set of nodes; and
store the set of nodes and the evaluation data as a contiguous block of data, wherein the set of nodes includes a first node and a second node, the second node corresponding to a likely execution path from the first node being physically stored adjacent to the first node.

12. The system of claim 11, wherein the feature index comprises a plurality of bits representing a feature index value, the plurality of bits corresponding to an initial set of bits of the contiguous block of data.

13. The system of claim 11, wherein the feature value comprises a second plurality of bits that represent a floating point value, the second plurality of bits being byte aligned to a byte boundary of the contiguous block of data, the feature value representing a particular value to compare with the value stored at the feature index of the input feature vector.

14. The system of claim 13, wherein the flag field comprises information indicating a branch comparison mode representing a comparison operation of the node.

15. The system of claim 14, wherein the flag field further comprises information indicating a first leaf node or first particular node corresponding to a true condition for the comparison operation of the node, and a second leaf node or second particular node corresponding to a false condition for the comparison operation of the node.

16. The system of claim 15, wherein the execution index comprises information indicating an index location related to a next operation based on a result of the comparison operation, the next operation corresponding to a different node or evaluation data.

17. The system of claim 16, wherein the memory device contains further instructions, which when executed by the processor, further cause the processor to:
access the first node from the set of nodes;
perform the comparison operation based on the branch comparison mode from the flag field;
determine whether the comparison operation evaluates to the true condition or the false condition; and
based on comparison operation, access the first particular node or first leaf node corresponding to the true condition, or access the second particular node or the second leaf node corresponding to the false condition.

18. The system of claim 15, wherein to perform the comparison operation further causes the processor to:
compare, based on the comparison operation, a particular value stored at the feature index of the input feature vector with the feature value.

19. The system of claim 18, wherein the memory device contains further instructions, which when executed by the processor, further cause the processor to:
apply an evaluation value to an output vector, the output vector including respective values indicating probabilities of potential results of the machine learning model
perform a post-processing operation on the output vector; and
provide the post-processed output vector as an output of the machine learning model.

20. A non-transitory computer-readable medium comprising instructions, which when executed by a computing device, cause the computing device to perform operations comprising:
accessing a first node from a set of nodes representing a tree structure, each node comprising a feature index, stored as an initial set of contiguous bits, for accessing a value stored in an input feature vector, a flag field indicating a branch comparison mode and branch directions, an execution index storing locations related to the branch directions, and a feature value for comparing with the value stored in the input feature vector, the tree structure corresponding to a machine learning model;
performing a comparison operation, based on the branch comparison mode from the flag field, between the features value with the value stored in the input feature vector;
determining whether the comparison operation evaluates to a true condition or a false condition;
based on comparison operation and the branch directions indicated in the flag field, accessing a first particular node or a first leaf node corresponding to the true condition, or accessing a second particular node or a second leaf node corresponding to the false condition.

* * * * *